United States Patent [19]

Hoggan

[11] 4,191,450

[45] Mar. 4, 1980

[54] DOUBLE CLIP LETTERING GUIDE ADJUSTMENT WEDGE

[76] Inventor: Daniel H. Hoggan, 952 Foothill Dr., Providence, Utah 84332

[21] Appl. No.: 915,522

[22] Filed: Jun. 14, 1978

[51] Int. Cl.[2] .............................................. G03B 21/56

[52] U.S. Cl. ................................. 350/121; 24/81 PC; 350/174

[58] Field of Search .................... 350/121, 174; 35/37; 24/81 R, 81 PC, 81 WH

[56] References Cited

U.S. PATENT DOCUMENTS

| | | | |
|---|---|---|---|
| 1,420,491 | 6/1922 | Morse | 350/174 |
| 3,291,552 | 12/1966 | Hoggan | 350/174 |
| 3,819,251 | 6/1974 | Hoggan | 350/121 |

*Primary Examiner*—Richard A. Wintercorn

*Attorney, Agent, or Firm*—K. S. Cornaby

[57] ABSTRACT

An adjustment wedge having means for verticallay adjusting the wedge in a double clip member of an optical lettering guide provides adjustment of the angular relationship between a tinted transparent window card held in one clip of the guide and an image-producing card held in the other clip. The adjustment wedge is used to precisely adjust the angle between the window card and the image-producing card to match the angle between the window card and the drawing surface. Following such adjustment, the card image appears to be superimposed exactly on the plane of the drawing surface.

9 Claims, 3 Drawing Figures

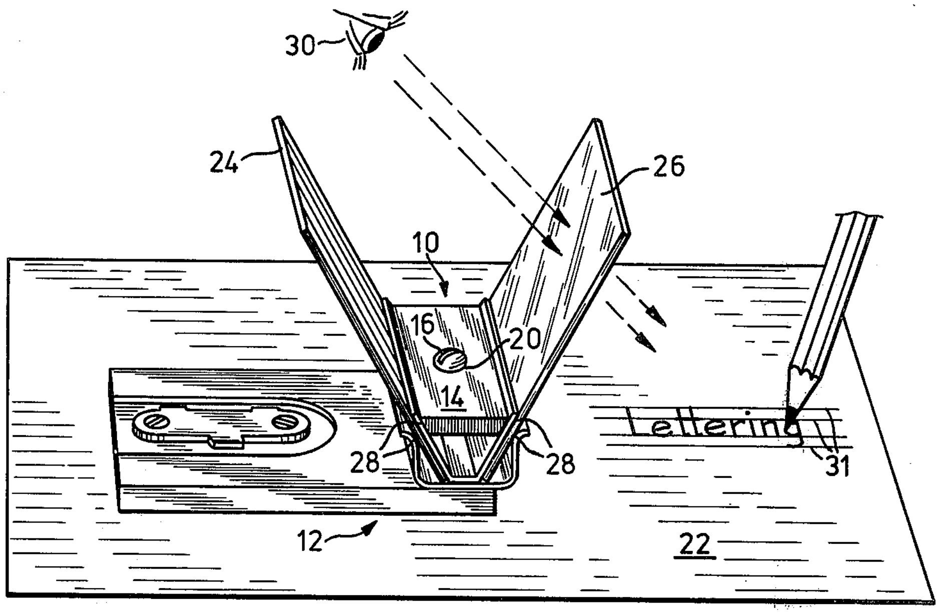
FIG. 1
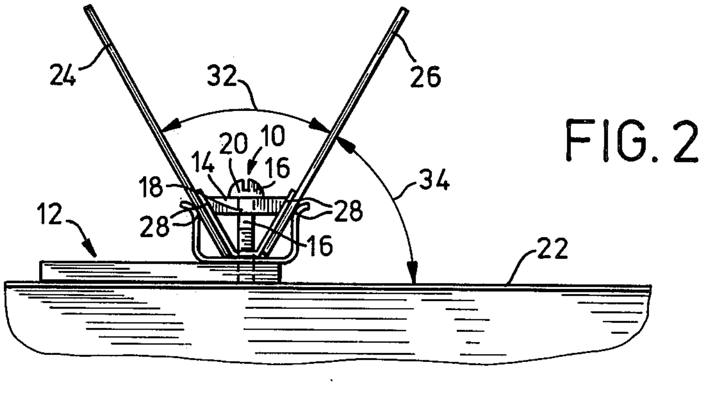
FIG. 2
FIG. 3
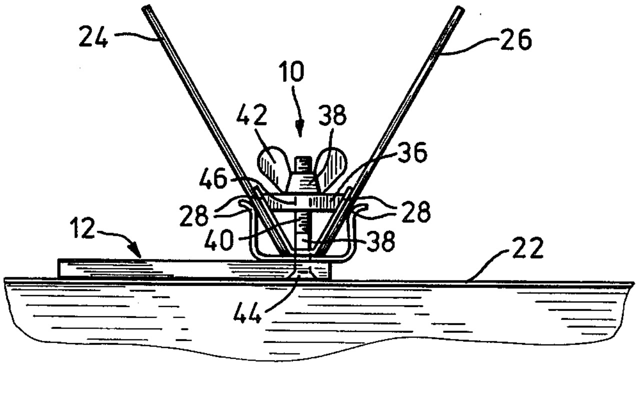

DOUBLE CLIP LETTERING GUIDE ADJUSTMENT WEDGE

BACKGROUND OF THE INVENTION

This invention is an improvement on the device described in U.S. Pat. No. 3,819,251, issued June 25, 1974, for a Double Clip Lettering Guide.

The above-referenced lettering guide utilizes a double clip member which has a fixed angle between one clip adapted for holding a transparent window card and a second clip for holding an image-producing card. When the angle between the window card and the image-producing card equals the angle between the window card and the drawing surface plane upon which the letterint guide rests, the image from the image-producing card is reflected upon the drawing surface plane. It was found that the necessary angular precision could not be achieved by dies produced from machine stamping processes. This, in turn, requires difficult and time consuming hand adjustment of the double clip members. Also, the use of image-producing cards and tinted window cards of various thicknesses causes distortion of the positions of the clips which results in variations in the fixed angle between the two clip members. Furthermore, mounting and assembly of the lettering guide on a drafting machine and the repeated use of the device causes slight angular distortions. The distortions in the fixed angle result in reflection of the image above or below the plane of the drawing surface limiting the usefulness of the lettering guide.

It is an objective of the present invention to provide for the adjustment of the angle between the two clip members in the double clip lettering guide by providing an adjustment wedge which can vary the angle between the two clip members.

SUMMARY OF THE INVENTION

The adjustment wedge of the invention is used in combination with a double clip lettering guide and has a rigid wedge member adapted to be movably disposed between the lettering guide's two clip members. The wedge member has means for adjusting the position of the wedge against the clip members, such that the angle between the two clip members can be increased or decreased as desired.

THE DRAWINGS

Preferred embodiments of the invention are illustrated in the accompanying drawings, in which:

FIG. 1 is a perspective view of the adjustment wedge employed in position in a double clip lettering guide;

FIG. 2, an end elevational view of the adjustment wedge and lettering guide showing a screw mechanism as the adjusting means;

FIG. 3 is an elevational view of another embodiment of the invention showing a screw mechanism utilizing a flat head machine screw and wing nut.

DETAILED DESCRIPTION OF THE ILLUSTRATED EMBODIMENTS

As shown in FIGS. 1–2, a preferred embodiment of the adjustment wedge is indicated generally as reference number 10. Adjustment wedge 10, used in combination with a double clip lettering guide (indicated generally as reference number 12), has a wedge-shaped member 14 and at least one adjustable screw mechanism 16 as a preferred embodiment of the wedge adjustment means. Wedge 14 preferably has a substantially rectangular-shaped base with trapezoidal cross section, and an aperture 18 centrally disposed for receiving and holding screw 20 therein. Wedge 14 can be constructed of metal, plastic, wood, or other relatively rigid material. Screw mechanism 16 comprises in this embodiment a machine screw 20 rotatably disposed within aperture 18 and adapted to be secured to lettering guide 12.

A few simple steps are employed to utilize the present invention. The lettering guide 12 as disclosed in U.S. Pat. No. 3,819,251 may be attached to a drafting machine (not shown) and positioned on a drawing surface, shown in this embodiment as a sheet of paper 22. An image-producing card 24 and a tinted transparent window card 26 are disposed respectively within the two clips of double clip member 28, so as to form an acute angle between the two cards. Guide 12 is aligned horizontally and vertically along paper 22 as is most convenient to the user, shown as the eye 30. An image 31 of the guide lines from image-producing card 24 appears on paper 22, but may appear above or below the surface plane of paper 22. In order for the guide line image to appear superimposed exactly on the drawing surface, plane, the angle 32 must equal the angle 34 as shown in FIG. 2. Wedge 14 can be moved downward against the clip members 28 to increase angle 32 and decrease angle 34 by tightening the screw mechanism 16 against the base of lettering guide 12. By loosening screw mechanism 16 the resiliency of the double clip 28 forces wedge 14 upward thereby reducing angle 32 and increasing angle 34. When image 31 is focused as desired, the user may letter as illustrated in FIG. 1.

Another preferred embodiment of adjustment wedge 10 is shown in FIG. 3, and comprises a wedge 36 and a screw mechanism 38. Wedge 36 is substantially the same as wedge 14 in the first embodiment. Screw mechanism 38 comprises in this embodiment at least one flat head machine screw 40 and a wing nut 42. Flat head screw 40 is disposed within a countersunk aperture 44 in the base of lettering guide 12 and protrudes through an aperture 46 in wedge 36. This embodiment permits the operation of screw mechanism 38 without a screwdriver.

For wider based lettering guides, it may be desirable to employ two or more screw mechanisms, or adjustable clamp means attachable to the lettering guide base as a means of adjusting the position of wedge 36 in FIG. 3 or of wedge 14 in FIGS. 1 and 2.

It is to be understood that the particular forms of the invention described herein and illustrated in the accompanying drawings are preferred embodiments. Substantial equivalents obvious to those skilled in the art are intended to be included within the scope of the invention as defined in the appended claims.

I claim:

1. An adjustment wedge for adjusting the angle between the clips of a double clip lettering guide, comprising in combination an adjustment wedge member and means attached to the wedge member for adjusting the position of the wedge member with respect to lettering guide, such that said wedge member and the double clip adjustably position and hold the lettering guide.

2. An adjustment wedge as set forth in claim 1, wherein said wedge has a substantially rectangular base and a substantially trapezoidal cross section.

3. An adjustment wedge as set forth in claim 1, wherein said wedge is constructed of metal.

4. An adjustment wedge as set forth in claim 1, wherein said wedge is constructed of plastic.

5. An adjustment wedge as set forth in claim 1, wherein said wedge has at least one aperture disposed therethrough.

6. An adjustment wedge as set forth in claim 5, wherein said adjustment means comprises a screw means rotatably disposed in each said wedge member aperture for attachment to the lettering guide.

7. An adjustment wedge as set forth in claim 6, wherein said screw means comprises a machine screw with a thumb screw head.

8. An adjustment wedge as set forth in claim 6, wherein said screw means comprises a flat head screw for disposition within an aperture in the lettering guide and for disposition in the aperture in said wedge, and a nut for attachment to said screw.

9. An adjustment wedge as set forth in claim 8, wherein said nut is a wing nut.

* * * * *